United States Patent [19]
Moody et al.

[11] 3,734,621
[45] May 22, 1973

[54] SPECTROPHOTOMETER UTILIZING MEMORY STORAGE CALIBRATION TECHNIQUES

[75] Inventors: Robert E. Moody, Los Altos Hills; David A. Wilson, Palo Alto, both of Calif.

[73] Assignee: Hewlett-Packard Company, Palo Alto, Calif.

[22] Filed: Dec. 6, 1971

[21] Appl. No.: 205,243

[52] U.S. Cl. .................. 356/95, 356/97, 356/206
[51] Int. Cl. ........................................... G01j 3/42
[58] Field of Search ............ 356/51, 88, 89, 93–97, 356/204–206, 229; 350/149

[56] References Cited

UNITED STATES PATENTS

| | | | |
|---|---|---|---|
| 3,632,193 | 1/1972 | Kusters | 350/149 |
| 2,984,146 | 5/1961 | Kwart et al. | 356/51 |

FOREIGN PATENTS OR APPLICATIONS

| | | | |
|---|---|---|---|
| 1,074,810 | 7/1967 | Great Britain | 356/229 |

OTHER PUBLICATIONS

Chance et al., The Review of Scientific Instruments, Vol. 41, No. 1, January 1970, Pages 111–115.

*Primary Examiner*—Ronald L. Wibert
*Assistant Examiner*—F. L. Evans
*Attorney*—Roland I. Griffin

[57] ABSTRACT

A spectrophotometer having no moving parts in the monochromator or the optical beam paths through the reference material and the sample material is disclosed. A preferred form of monochromator utilized is an acousto-optical filter tuned over the desired spectrum electronically by variation of the radio frequency producing the acoustical wave in the filter. A single beam spectrophotometer employs a memory device for storing the detected transmitted optical radiation in a first calibration run with the sample absent from the path, a divider circuit producing a ratio signal output responsive to one input comprising the detected transmitted optical radiation in a second measurement run with the sample in place and a second input comprising the absorption signal stored in the memory. A double beam spectrophotometer utilizes an optical beam splitter to split the radiation into two separate paths, one path extending through a reference material and the other path through the sample, the transmitted light detected in the two paths being transmitted to a divider circuit to produce an output dependent on the ratio of the two detected radiation beams. A calibration run with reference and sample absent may be made and stored in a memory, followed by a measurement run with reference and sample in place, and the two output ratios then compared to give a final ratio signal output. In a further embodiment, two optical sources and two associated monochromators are provided, the radiation from each being directed through the beam splitter into the two separate reference and sample paths to the detector circuitry.

12 Claims, 5 Drawing Figures

SPECTROPHOTOMETER UTILIZING MEMORY STORAGE CALIBRATION TECHNIQUES

BACKGROUND OF THE INVENTION

A number of different types of spectrophotometers wherein a sample is chemically and/or physically analyzed by measuring the absorption of optical radiation passing therethrough as a function of the optical wavelength are presently in use. A typical form of spectrophotometer will scan through a spectrum, from 2,000 to 8,000 A, with a resolution, for example, of 1 to 10 A. In a relatively simple type of single beam system, the radiation from a source of light is directed through a lens system and into a monochromator, typically an optical prism system or diffraction grating, which serves to separate the narrow band of wavelengths to be delivered to the sample under investigation. Generally, mechanical means such as a moving disperser serves to scan the monochromator output past a slit for the full spectrum range of interest. An optical detector such as a photomultiplier device measures the light passing out from the sample, the percentage of light transmission being recorded on a suitable recording means such as an X-Y recorder as a function of the scanned radiation. This plot of percent optical transmission is then used to analyze the sample.

These spectrophotometers are divided into various general classes in accordance with specific structural characteristics. For example, spectrophotometers may utilize optical prisms, diffraction gratings, combination prism-grating systems, or combination filter-grating systems for providing the narrow line spectrum output from the monochromator. Spectrophotometers may also function as single beam or double beam systems, the double beam systems being sub-classified in accordance with whether the optical beam is divided in intensity or time multiplexed.

Considering the single beam device, the signal output is a product of the following general factors, all of which are a function of the wavelength; the power output of the light source, $P(\lambda)$, the efficiency of light transmission of the monochromator, and associated optics $E(\lambda)$, the transmission efficiency of the sample material, $T(\lambda)$, and the sensitivity of the light detector, $S(\lambda)$. Thus, although it is desired that only the transmission efficiency of the sample material be measured as a function of the scanned radiation, the other three factors contribute to the output obtained from the system. To compensate for these undesired factors in the output, prior art devices have sought to precalibrate the system, the operator being instructed to take into account the calibration of the instrument across the spectrum in analyzing the output signal.

To overcome this requirement for calibration on the part of the operator, double beam systems are utilized wherein the optical radiation is transmitted over two separate paths, one path including the sample material under analysis and the other path including a reference material. The output radiation from the two detectors are compared so that the final output is the ratio, $T_S/T_R$, of the light transmission detected in the sample path, $T_S$, and the light transmission detected in the reference path, $T_R$.

In one form of double beam system the output from the monochromator is transmitted to a beam splitter where the optical radiation is divided into two separate paths, one optical beam being transmitted through the reference material and the other optical beam being transmitted through the sample material under investigation. The radiation output from the reference material is transmitted to a first optical detector and the radiation from the sample material is transmitted to a second optical detector. The outputs from the two optical detectors are transmitted to an electronic divider circuit which produces an output proportional to the ratio of $T_S$ to $T_R$ as a function of $\lambda$. In this dividing step, the various undesired factors which are functions of the wavelength mentioned above cancel out except for differences of sensitivity of the optical detectors. This type of double beam system has the advantage that there are no moving parts in the radiation beam path from the monochromator to the optical detectors. However, this system is sensitive to unbalance in the division of the radiation by the splitter into the two paths, and photomultiplier sensitivity differences. For example, one path may contain 60 percent red and 40 percent blue light whereas the other path contains an inverse ratio. In addition, it is necessary that the optical detectors be very closely matched. Also, this system suffers from the fact that the optical beam passing through the sample under analysis is only one-half of the total radiation emitted from the source.

To avoid the problems encountered with transmission of only half the radiation through the sample material and the requirement of a matched pair of light detectors, a different form of double beam instrument is utilized wherein the optical radiation is time multiplexed such that for one portion of a time interval the radiation passes through the reference material and for the other portion of the time interval the radiation passes through the sample material under analysis. The radiation output from the monochromator is directed over the two separate paths by a rotating mirror chopper, the output radiation from the reference and sample being directed by a second rotating mirror synchronized with the first mirror onto a single optical detector. The output from the single detector is then sent to suitable electronic circuitry where the ratio of $T_S$ to $T_R$ is computed. This type of system is rather complex in that it requires moving parts in the two beam paths and the instrument is relatively slow because of the mechanical arrangement. In addition, the mirrors must be very carefully matched to obtain equal reflectivity over the entire wavelength range scanned.

SUMMARY OF THE INVENTION

In the present invention a novel spectrophotometer is provided which has no moving parts, is extremely fast, and does not require calibration computation by the operator after each sample analysis.

In one embodiment of the present invention, the monochromator output is scanned in a narrow waveband increment, i.e., 1 to 10 A, over a wide radiation spectrum. In a first calibration run, the radiation output from the monochromator is transmitted to a suitable radiation detector such as a photomultiplier with the sample material to be analyzed absent from the optical path. The output of the radiation detector is stored in a memory system scanned in synchronism with the scan of the monochromator. As a result, the radiation transmission characteristic of the system, absent the sample material, is recorded in the memory. Thereafter, with a sample to be analyzed, positioned in the radiation path during a subsequent scan by the monochromator, the output from the radiation detector is transmitted to a divider circuit, the other input to the divider circuit being the calibration signal stored in the memory and delivered in synchronism with the scan of the monochromator. The output of the divider circuit comprises a signal related to the ratio of the detected light transmission with the sample to the light transmission without the sample in place.

In another embodiment of the present invention, the optical radiation from the monochromator is divided by a beam splitter into two separate paths, one optical path passing through a reference material and the other optical path extending through the sample material under analysis. An optical detector at the end of the reference path transmits its signal output to a divider circuit, said divider receiving its other input from the optical detector in the sample path; the signal output of the divider is related to the ratio of the detected optical transmission in the two paths. In a first run, the reference and the sample are omitted from the two paths and the optical transmission ratio in the two paths is recorded in the memory as a function of the spectrum scan. In a subsequent scan, with both the reference and the sample being positioned in their respective optical beam paths, the outputs from the two radiation detectors are transmitted to a divider circuit for producing an output signal related to the ratio of the radiation detected in the two paths. The signal output from the divider is then compared in a second divider with the output from the memory for the corresponding wavelength to give a resultant output related to the ratio of the two ratios.

In additional embodiments of the invention, two optical sources and two associated monochromators are employed, each providing a portion of their radiation output to the two optical paths through the reference and the sample. In certain instances the two separate radiation beams may be at the same wavelengths and in other operations the two may be of different wavelengths.

A preferred form of monochromator for use in these embodiments comprises an acousto-optic filter which is electronically tuned across the desired radiation spectrum, the memory being synchronized with the filter scan.

DESCRIPTION OF THE PREFERRED EMBODIMENTS

Figure 1:
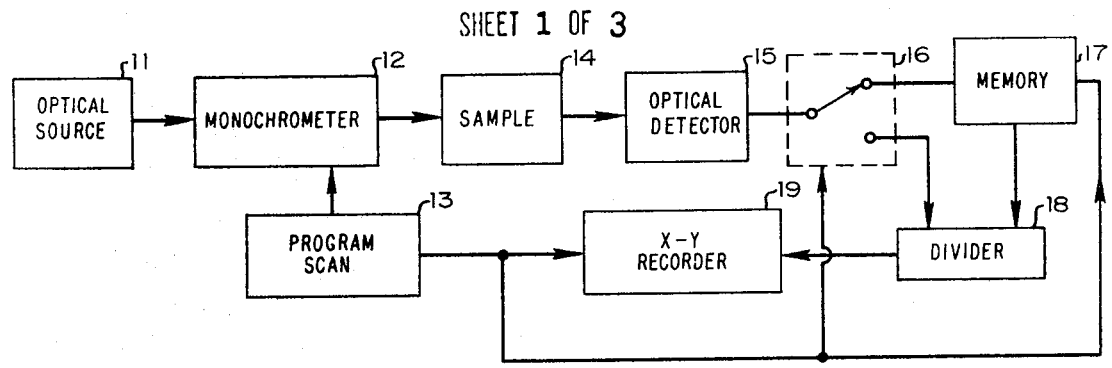
FIG. 1 is a block diagram of a single beam spectrophotometer apparatus of the present invention.

Referring now to FIG. 1, the spectrophotometer comprises a radiation source 11 having a wide band emission spectrum and a monochromator 12 for selecting a narrow wavelength increment, e.g., $\Delta\lambda = 1$ A to 10 A, with programmer means 13 to scan the narrow band monochromator output over the desired radiation spectrum, e.g., from 2,000 A to 8,000 A, or from 2.5 $\mu$m to 15 $\mu$m.

The monochromator output is directed along a path through a sample 14 under analysis and onto an optical detector 15 that produces an output signal dependent on the impinging radiation. A switch 16, while in one position, couples the output of the optical detector to a memory device 17, such as a digital storage system, which is also coupled to the scanning means 13. In the second position, the switch 16 couples the optical detector output to a divider circuit 18, the other input of the divider being coupled to the output of the memory 17. The output of the divider 18 is coupled to a suitable recording means such as an X-Y recorder 19.

In operation, a first scan through the radiation spectrum is instigated with a known reference material in the optical path between the monochromator 12 and the optical detector 15, and with the switch 16 connecting the output of the optical detector 15 to the memory 17. The memory is scanned in syn-chronism with the monochromator, and the output of the optical detector, which is related to the optical radiation impinging thereon, is stored in the memory as a function of the scanned spectrum.

Thereafter, the sample to be analyzed replaces the reference sample in the optical path, and a new scan of the radiation spectrum is initiated by the programmer 13, with the switch 16 connecting the optical detector 15 output to the divider circuit 18. The stored reference signal in the memory 17 is delivered to the divider 18 in synchronism with the scanned radiation, and the divider operates to produce an output signal which is related to the ratio of the detected radiation transmission during the sample run, $T_S$, to the detected radiation transmission during the reference run, $T_R$. This output ratio signal is recorded on the X-Y recorder which is synchronized with the radiation scan.

In a preferred form of spectrophotometer, the monochromator comprises an acousto-optic filter tunable over its spectrum range electronically. The optical frequency of the output radiation of the filter is tuned over a relatively wide band of optical frequencies, for example, 2,000 A to 4,000 A in the case of a quartz filter and 4,000 A to 8,000 A in the case of a $CaMoO_4$ crystal, by varying the frequency of an acoustical wave collinearly disposed with the optical wave in the crystal. The acoustic wave is tuned by means of a transducer attached to the crystal and activated from a tunable radio frequency source. Such an acousto-optic tunable filter is disclosed in an article entitled "Acousto-Optic Tunable Filter" in the Journal of the Optical Society of America, Vol. 59, No. 6, June 1969, pages 744-747, and an article entitled "Electronically Tunable Acousto-Optic Filter" in the Applied Physics Letters, Vol. 15, No. 10, Nov. 15, 1969, pages 325 and 326. As the acousto-optic filter monochromator is scanned over its operating band width by tuning the acoustic wave, the memory 17 is scanned in synchronism therewith, as is the X-Y recorder 18.

The use of an acousto-optical filter is advantageous for a number of reasons. Since the filter is electronically tunable, the system has random access capability; specific segments within the overall spectrum range can be easily selected, and switching from one discrete frequency range to another is readily accomplished electronically.

In prior art monochromator systems, all the light, including the undesired scattered radiation, was chopped, and the undesired light was also detected since it was at the correct chopped frequency, and an error signal resulted. Since only the desired wavelengths of light from the acousto-optic filter are chopped, unwanted wavelengths of light can be eliminated easily by electronic techniques.

Most monochromators have long optical paths leading to errors due to atmospheric absorption. The acousto-optical filter system has a relatively short optical path. Also, no optical coatings such as aluminum reflectors which tend to age and introduce errors into the system are utilized.

Figure 2:
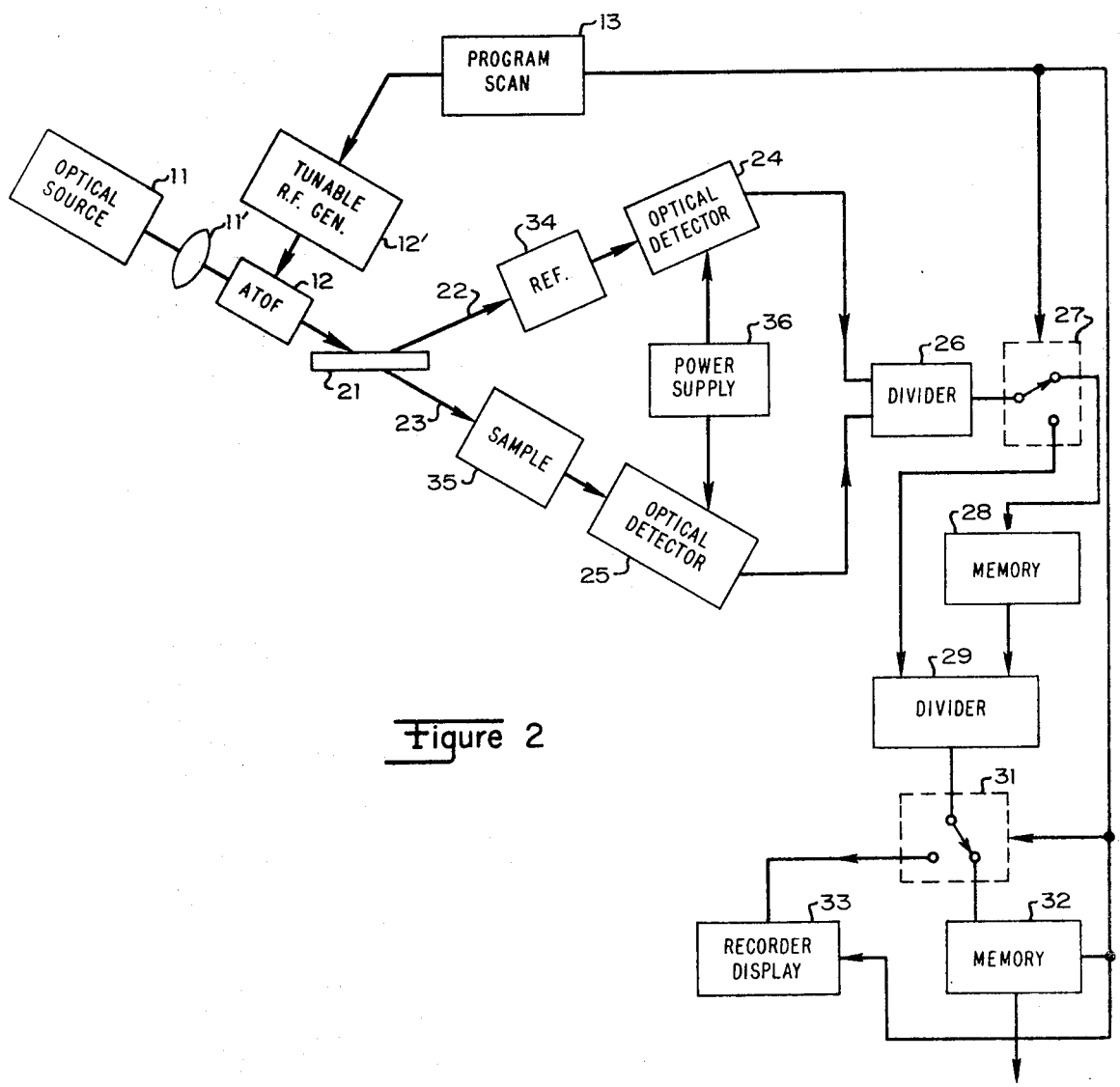
FIG. 2 is a block diagram of a double beam spectrometer of the present invention.

A double beam embodiment of the invention is disclosed in FIG. 2 and includes the optical source 11, and lens system 11' if needed, delivering the wide band optical radiation to the monochromator 12, preferably an acousto-optic filter which is scanned over its operating wavelength range by tuning the radio frequency generator 12' under control of the scan unit 13.

The output of the filter 12 is split into two separate paths by an optical beam splitter 21, for example an uncoated synthetic fused silica or fused quartz plate, one beam path 22 being directed through a reference material region and the other beam path 23 being directed through a sample material region. A satisfactory beam splitting is obtained with the synthetic fused silica plate when the incident angle is about 72°; an equal splitting of the optical radiation is preferred but not necessary.

The reference beam path 22 terminates in a suitable optical detector 24, for example a photomultiplier, and the sample beam path terminates in a similar optical detector 25. The outputs from the two optical detectors are coupled to a divider circuit 26 which produces an output which is the ratio of the radiation detected in the sample path to that detected in the reference path.

The output of the divider 26 is coupled via one position of switch 27 to a memory device 28, such as a digital storage apparatus, and coupled via a second switch position to another divider circuit 29. The other input to the divider circuit 29 is the output from the memory 28. The output of the divider 29 is coupled via switch 31 to a second memory apparatus 32 or to a recorder display device 33.

In operation a first scan of the spectrophotometer is made with the reference material 34 and the sample material absent from their beam paths 22 and 23, respectively, and with the switch 27 programmed to close the output of the divider 26 to the memory device 28. This calibration run may be conducted the first thing in the morning, for example, or as often during the day as the operator desires a recalibration.

The output of the divider circuit 26 will be the ratio of the detected optical radiation transmission in the sample path to the radiation in the reference path. The ratio will be close to 1, and will vary across the spectrum scan of the system, and it will be a function of reflectivity and transmission of the quartz plate and of the quantum efficiencies of the two photomultipliers. If the beam splitter sent exactly equal amounts of radiation along each path, and if both photodetectors had identical sensitivity, at each wavelength, then the ratio stored in the memory would be 1 at each wavelength. This ratio is:

$$R_1 = [I(\lambda,t) \beta_1 Q_2 / I(\lambda,t) \alpha_1 Q_1] = [\beta_1 Q_2 / \alpha_1 Q_1]$$

where $I$ is the light intensity from the filter, $\beta_1$ is the transmission of the plate 21, $\alpha_1$ is the reflectivity from the plate 21, and $Q_1$ and $Q_2$ are the quantum efficiencies of the two photodetectors 24 and 25, respectively. The radiation intensity $I(\lambda, t)$ cancels out in the ratio.

The next and subsequent runs are conducted with a reference material in the reference path and a sample material in the sample path. The switch 27 is operated to close the output of the divider circuit 26 to the second divider 29. The output from the divider circuit 26 is a new ratio $R_2$ which has added information as to the transmission of the two materials, $T_R$ and $T_S$. This new ratio is:

$$R_2 = [I(\lambda, t) \beta_1 Q_2 T_S / I(\lambda,t) \alpha_1 Q_1 T_R] = [\beta_1 Q_2 T_S / \alpha_1 Q_1 T_R]$$

During the scan time when the output of divider 26 is transmitted to divider 29, the memory 28 is operated in synchronism with the scan to deliver the ratio stored therein to the divider 29 which operates on these two input ratios $R_1$ and $R_2$ to produce a new output ratio $R_3$. Thus $$R_3 = (R_2/R_1) = (\beta_1 Q_2 T_S / \alpha_1 Q_1 T_R)/(\beta_1 Q_2 / \alpha_1 Q_1) = (T_S/T_R)$$

It can be seen that all factors drop out except for $T_S$ and $T_R$, and this resultant ratio serves as a very accurate measurement of the sample under analysis.

This ratio may be stored in a second memory 32 or it may be recorded on a suitable display means such as an X-Y recorder. If the ratio stored in memory 28 need not be used more than once, the memory 28 may serve the place of memory 32 to store the new ratio as the stored ratio is removed from the memory 28.

Figure 3:
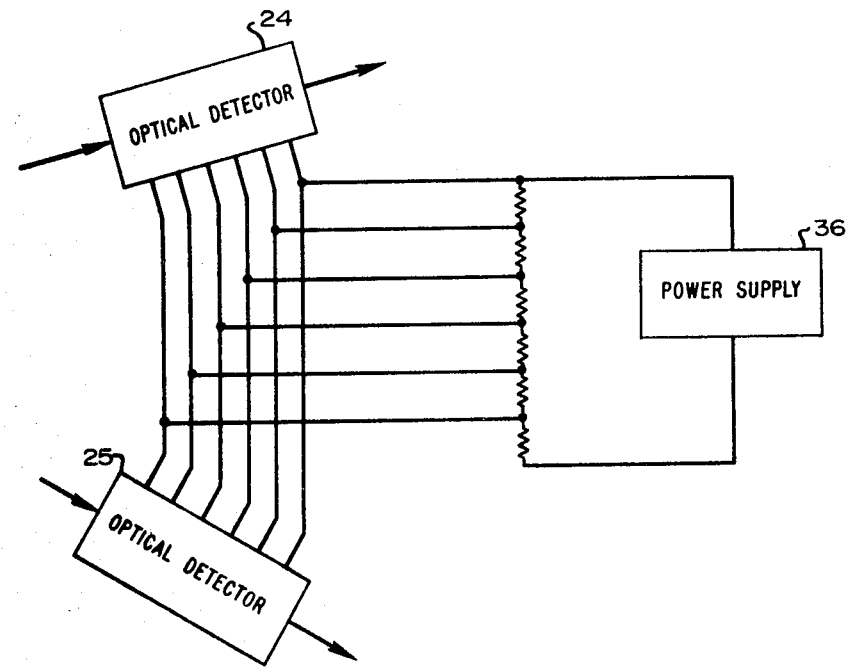
FIG. 3 is a schematic diagram illustrating a portion of the system of FIG. 2.

It is desired that the sensitivity of the two optical detectors maintain a fixed relationship since changes in the relative sensitivities will produce errors in the output from the system. The two optical detectors are also operated in their linear regions for best results. To help maintain the fixed relationship in sensitivity, the two detectors 24 and 25 are operated from the same power supply 36. It is also preferable that the two detectors have a common set of resistors establishing the dynode potentials as illustrated in FIG. 3.

Figure 4:
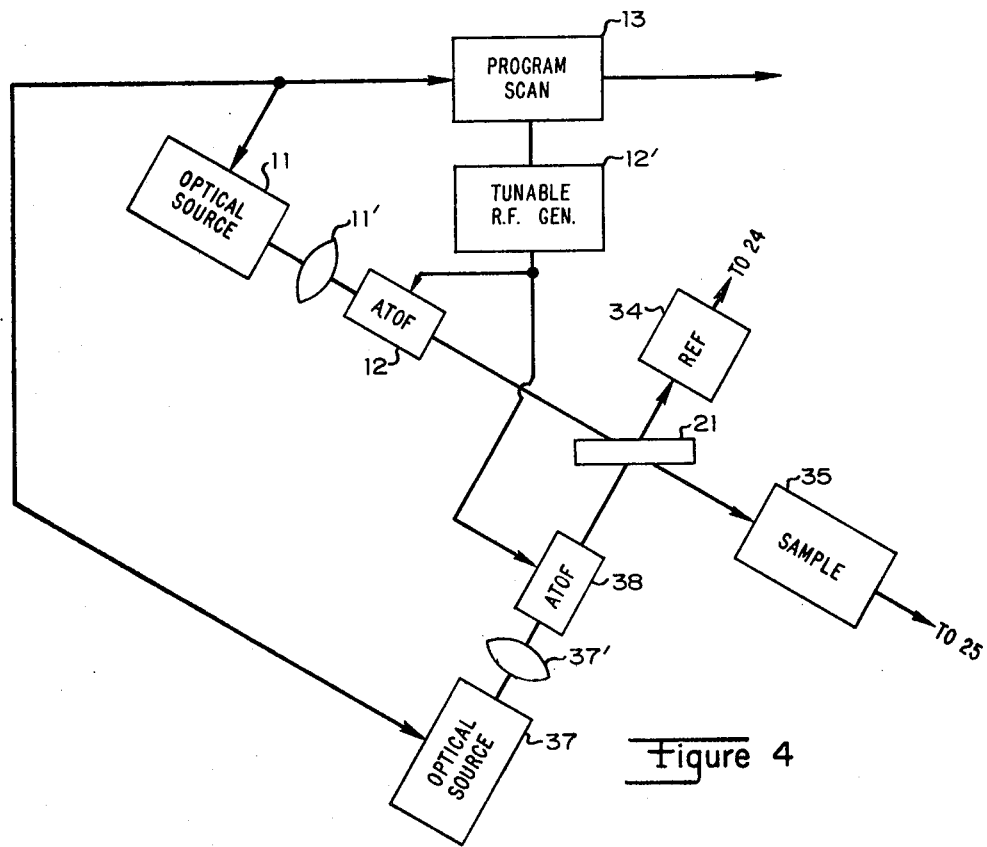
FIG. 4 is a block diagram of a modification of the double beam spectrophotometer of FIG. 2 to provide an increased radiation spectrum range.

To broaden the range of the system, a second optical source 37, lens system 37', and monochromator or acousto-optic filter 38 may be added to the system as shown in FIG. 4. If filter 12 is a quartz filter with a deuterium or UV source 11 covering the optical range of 2,000 A to 4,000 A, then the additional range of 4,000 A to 8,000 A may be covered by a second filter 38 of a $CaMoO_4$ crystal and a tungsten or visible lamp source 37. The program scan circuit will first operate source 11 and filter 12 for the shorter wavelength spectrum scan and will then switch to operation of source 37 and filter 38 for the subsequent longer wavelength spectrum scan. The system may also be operated with the two light sources 11 and 37 on at the same time.

The system of FIG. 4 may be used in a different mode of operation with monochromators 12 and 38 being similar and operating over the whole wavelength range covered by optical sources 11 and 37. In this mode both monochromators are operated simultaneously with both optical sources contributing to the signal strength simultaneously although the wavelength regions of maximum light output differ for the two lamps.

Where a higher intensity of light is desired through the two materials, the optical source 11 and monochromator 12 may be similar to optical source 37 and monochromator 38, the sources being operated simultaneously and the monochromators being scanned together, resulting in a substantially doubled light intensity through the system.

Figure 5:
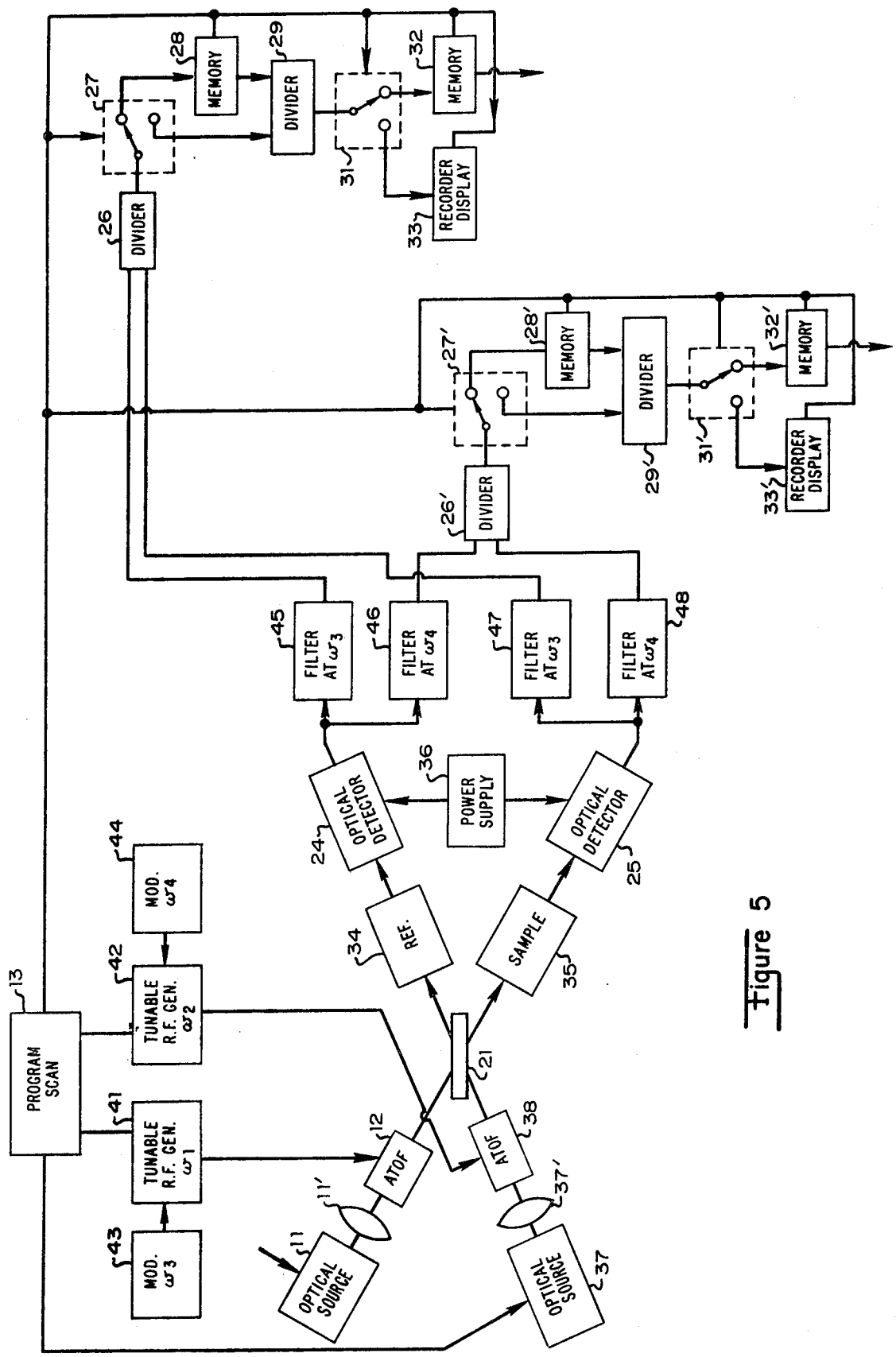
FIG. 5 is a block diagram of still another two beam embodiment of the present invention providing two separate simultaneous analyses.

In the embodiment of the invention shown in FIG. 5, the two separate light beams are at two separate wavelengths, for example, 3,700 A and 4,000 A, so that an analysis of the sample may be carried out at the two discrete wavelengths simultaneously. One of the acousto-optic filters 12 is operated at an RF frequency of $\omega_1$ from RF generator 41 (i.e., 100 MHz to give 3,700 A) and the other filter 38 is operated at an RF frequency of $\omega_2$ from RF generator 42 (i.e., 90 MHz to give 4,000 A); the $\omega_1$ frequency is modulated by modulator 43 at $\omega_3$, for example 1 KHz and the $\omega_2$ frequency is modulated by modulator 44 at $\omega_4$, for example 1.7 KHz.

Both modulated wavelengths pass through the reference 34 and the sample 35 to the associated optical detectors 24 and 25, respectively. A pair of electronic filters 45 and 46 centered at $\omega_3$ and $\omega_4$, respectively, are coupled to the output of detector 24 and a second pair of similar electronic filters 47 and 48 are coupled to the output of detector 25. The outputs of the two $\omega_3$ filters 45 and 47 are coupled to one divider 26 and pass the 3,700 A light from the two paths to the divider and its associated measurement circuitry 27–33. The outputs of the two $\omega_4$ filters 46 and 48 are coupled to a second divider 26' and pass the 4,000 A from the two paths to this divider and its associated measurement circuitry 27'–33'.

Both monochromators can sit on their respective wavelengths for the two separate measurements to be made, or both can be scanned by the program scan 13 as described above, or one can remain fixed and the other scanned if desired.

Although quartz and calcium molybdate crystals have been suggested for use as the acousto-optical filters in certain of the above embodiments, it should be understood that other known crystals may be employed such as lithium niobate and proustite. It should also be noted that the techniques described in these monochromator systems are applicable over a wide optical range including the infrared, visible, and ultraviolet, and can extend from 1,000 A to 1,000 microns. Various types of optical sources and optical detectors, including solid state devices, may be employed. The systems can be made in a modular design so that sources and/or detectors can be replaced to extend the range of the device over different frequency bands, for example an ultraviolet device with add-on units for visible and infrared operation.

We claim:

1. Apparatus for analyzing a sample material comprising:
   a first source for emitting a first beam of optical radiation having a first emission spectrum;
   a second source for emitting a second beam of optical radiation having a second emission spectrum;
   a first monochromator for selecting a narrow band of radiation from the first beam and scanning it over the first emission spectrum;
   a second monochromator for selecting a narrow band of radiation from the second beam and scanning it over the second emission spectrum;
   beam splitting means for splitting each of the narrow bands of radiation into two portions and directing a first portion of the radiation from the first beam simultaneously with a first portion of the radiation from the second beam along a reference path normally containing a reference material and directing a second portion of the radiation from the first beam simultaneously with a second portion of the radiation from the second beam along a sample path normally containing a sample material to be analyzed;
   first detection means for detecting the radiation traversing the sample path to develop an output signal related to the radiation impinging on the first detection means;
   second detection means for detecting the radiation traversing the reference path to develop an output signal related to the radiation impinging on the second detection means;
   first comparator means for comparing the output signals obtained from the first and second detection means during a first emission spectrum scan with the reference and sample materials absent from their respective paths, to produce a first ratio signal indicative of the ratio of the output signals;
   memory means for storing the first ratio signal as a function of the first emission spectrum scan;
   second comparator means for comparing the first ratio signal stored in the memory means with a second ratio signal obtained from the first comparator means during a second emission spectrum scan with the reference and sample materials present in their respective paths to obtain an output signal related to the ratio of the first and second ratio signals as a function of the first and second emission spectrum scans.

2. Apparatus as in claim 1 wherein said first and second monochromators select different narrow bands of radiation.

3. Apparatus as in claim 2 wherein said first and second sources have different emission spectra.

4. Apparatus as in claim 2 wherein said first and second sources have identical emission spectra.

5. Apparatus as in claim 1 wherein said first and second monochromators select identical narrow bands of radiation.

6. Apparatus as in claim 5 wherein said first and second sources have different emission spectra.

7. Apparatus as in claim 5 wherein said first and second sources have identical emission spectra.

8. Apparatus as in claim 1 wherein each of said first and second monochromators comprises an acousto-optical filter and means for electronically tuning the filter over one of the first and second emission spectra.

9. Apparatus as in claim 8 wherein each of said filters is made of a material selected from the group consisting of quartz, calcium molybdate, lithium niobate and proustite.

10. Apparatus as in claim 1 wherein said beam splitting means comprises an optical plate for transmitting a portion of each beam and reflecting a portion of each beam.

11. Apparatus as in claim 1 including:

modulating means for electronically modulating the radiation from each source; and demodulating means for electronically demodulating the output signals from the first and second detection means in order to distinguish a part of each output signal that is responsive to the radiation from the first source and a part of each output signal that is responsive to the radiation from the second source.

12. Apparatus as in claim 11 wherein said modulating means frequency modulates the radiation from each source.

* * * * *